(No Model.) 4 Sheets—Sheet 1.
F. W. CROSS.
COTTON SEED HULLING MACHINE.
No. 600,575. Patented Mar. 15, 1898.
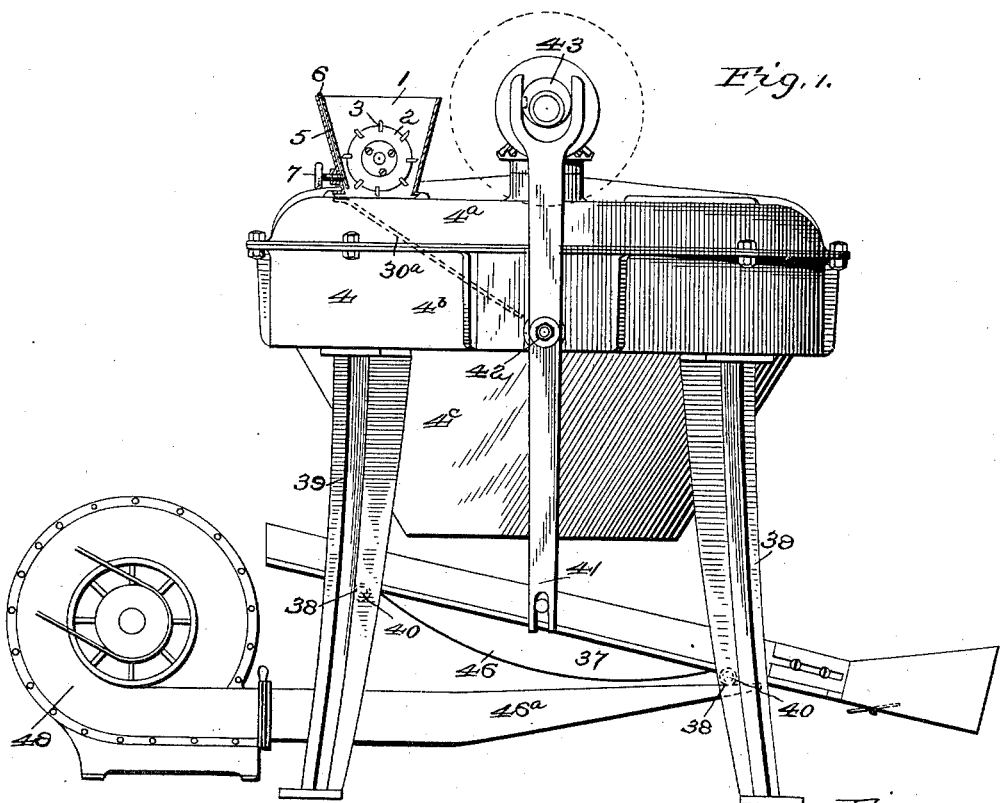
Fig. 1.
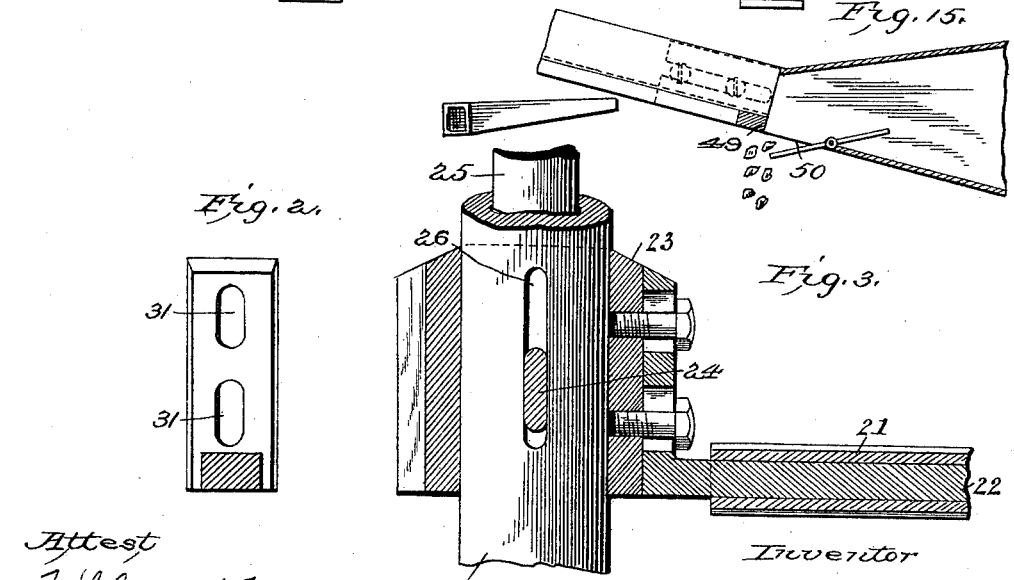
Fig. 15.
Fig. 2.
Fig. 3.
Attest
F. L. Middleton
James M. Shear
Inventor
Frank W. Cross
By Ellis Spear
Atty

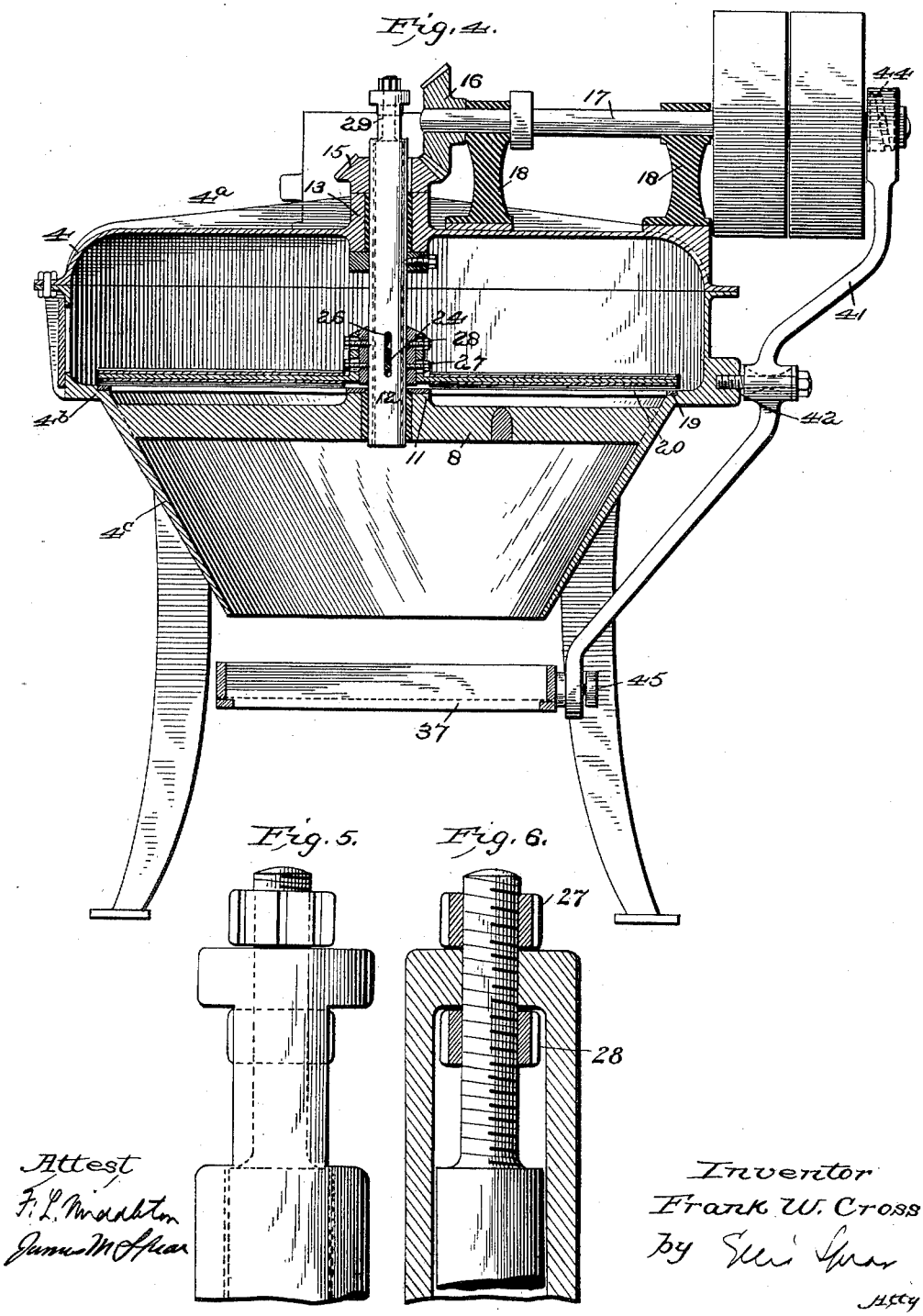

(No Model.) 4 Sheets—Sheet 3.
F. W. CROSS.
COTTON SEED HULLING MACHINE.
No. 600,575. Patented Mar. 15, 1898.
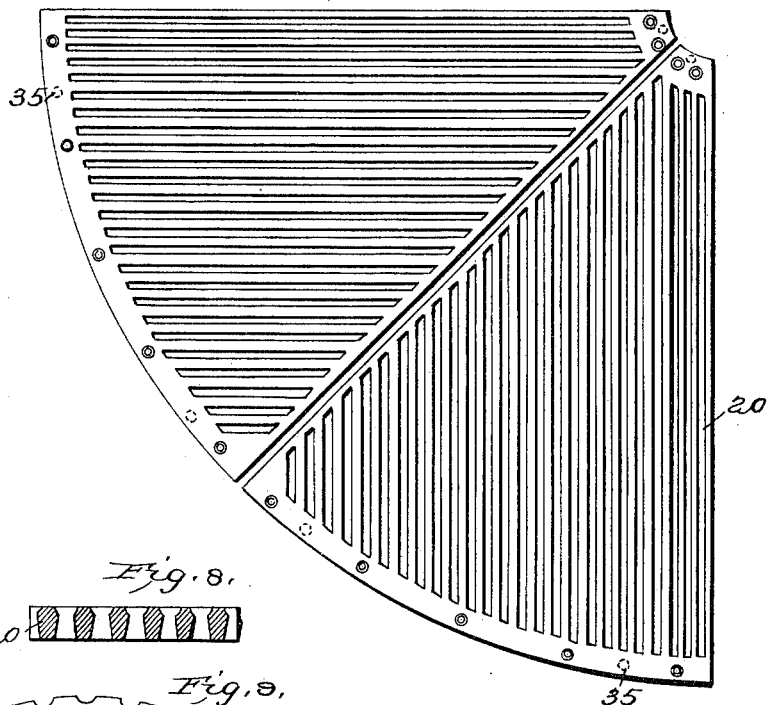
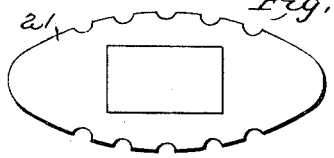
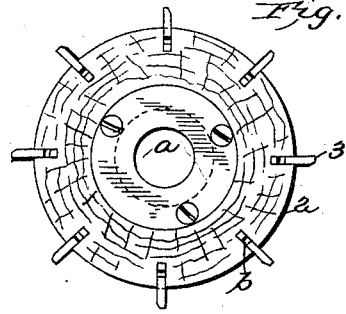
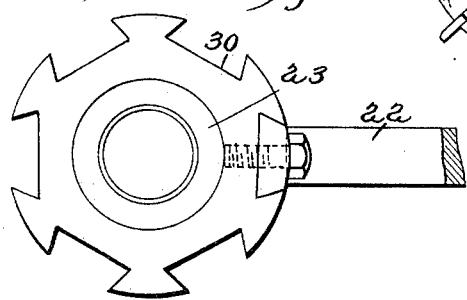
Attest
F. L. Middleton
James M. Shean
Inventor
Frank W. Cross
by Eli Spear
Atty
THE NORRIS PETERS CO., PHOTO-LITHO., WASHINGTON, D. C.

(No Model.) 4 Sheets—Sheet 4.

F. W. CROSS.
COTTON SEED HULLING MACHINE.

No. 600,575. Patented Mar. 15, 1898.

Attest
F. L. Middleton
James M. Shear

Inventor
Frank W. Cross
by Ellis Spear
Atty

THE NORRIS PETERS CO., PHOTO-LITHO., WASHINGTON, D. C.

UNITED STATES PATENT OFFICE.

FRANK W. CROSS, OF BALTIMORE, MARYLAND, ASSIGNOR OF ONE-HALF TO HENRY F. GETZ, OF WASHINGTON, DISTRICT OF COLUMBIA.

COTTON-SEED-HULLING MACHINE.

SPECIFICATION forming part of Letters Patent No. 600,575, dated March 15, 1898.

Application filed July 20, 1896. Serial No. 599,871. (No model.)

*To all whom it may concern:*

Be it known that I, FRANK W. CROSS, a citizen of the United States, residing at Baltimore, in the State of Maryland, have invented certain new and useful Improvements in Cotton-Seed-Hulling Machines, of which the following is a specification, reference being had therein to the accompanying drawings.

It is the object of my invention to provide an effective and simple machine for treating delinted cotton-seed by opening said seed without crushing the same and then separating the split and opened hull from the meat kernel, the latter remaining intact or in its natural state and containing its full quantity of oil ready for extraction, if desired, without danger of discoloration or damage, which would result were the hull and kernel crushed to any extent into a mass. I aim also to so split the hull that the kernel will be freed therefrom; but the hull is not broken up into separate pieces, and I am thus enabled to blow the hull in its whole state from the kernel after the latter has been freed from the hull by splitting the latter.

Figure 11A:
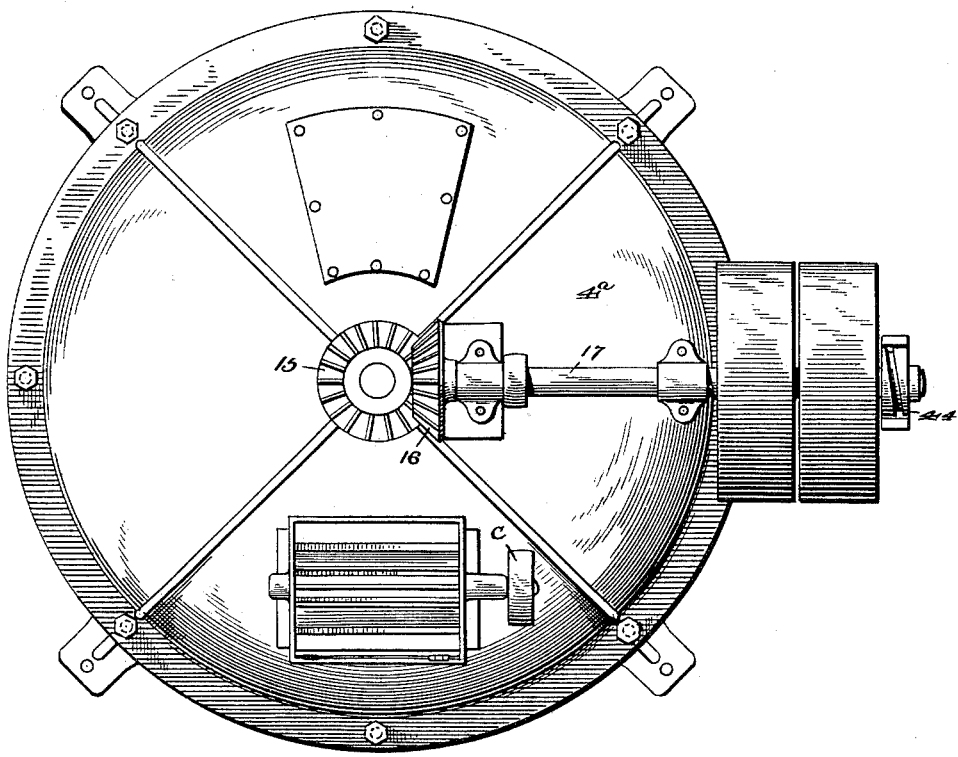
Figure 12:
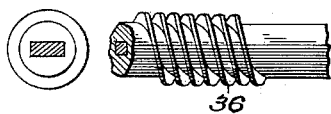
Figure 13:
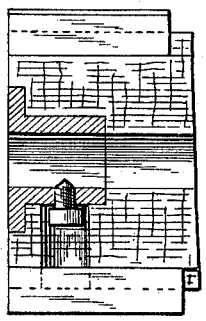
Figure 14:
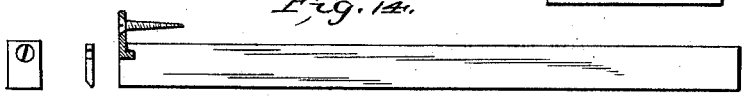

In the drawings, Figure 1 is a side view of the machine. Figs. 2 and 3 are detail views of the seed rubbing or carrying arms; Fig. 4, a vertical sectional view of the machine; Figs. 5 and 6, details of the means for adjusting the position of said rubbing-arms; Fig. 7, a plan view of two sections of the slotted plate or grating on which the seeds are rubbed by the carrying-arms. Fig. 8 is a detail cross-sectional view of the said plate. Fig. 9 is a view of one of the rubbers; Fig. 10, a detail plan view of the hub for carrying the rubber-arms, and Fig. 11 a detail view of the feed-roller for the seed. Fig. 11$^a$ is a plan view of the machine. Fig. 12 shows details of a modified form of rubbing-arm. Fig. 13 is a sectional view of the feed-roller. Fig. 14 shows details of the same.

The seed to be operated on are placed in a hopper 1 on the main casing, and in this hopper a rotary feed-roll 2 is placed, having projecting flanges 3 to act upon the seed and feed them in a regulated quantity into the main casing 4. The hopper has an adjustable plate 5 hinged at its upper end at 6 and extending down along the wall of the hopper opposite the feed-roller. It is adjusted toward and from the feed-roller by a screw 7, passing through a boss on the hopper and engaging the lower free end of the plate to adjust the same relatively to the feed-roller and thus provide means for regulating the feed, it being desired that the quantity of seed being acted on within the casing at a time be a determined one.

The feed-roller is formed of wood with metal end journals $a$, and the blades are of metal, held to the wood body by clips $b$, engaging notches in the ends of the blades.

The feed-roller is rotated by a belt applied to the pulley $c$ on the shaft of said roller outside the hopper.

The casing 4 comprises an upper covering portion 4$^a$ and a lower ring-shaped portion 4$^b$, connected thereto, the latter having a depending extension 4$^c$ of conical or funnel shape. Across the upper part of the conical extension arms 8 extend, having a central bearing-boss 11, in which is journaled the lower end of a vertical hollow shaft 12, which extends up through a second bearing-boss 13 on the cover of the casing, its upper end having keyed thereto a beveled pinion 15, in which meshes a pinion 16 on a horizontal shaft 17, journaled in standards or posts 18 and having on its outer end the pulleys by which the vertical shaft may be driven either one way or the other. Across the top of the conical extension and resting on the shoulder 19 I arrange a grating or slotted plate 20, made up of eight sections, their central portions resting on the central bearing-boss 11, and thus forming a grated or slotted bottom to the casing. Upon this slotted plate the seed are rolled or rubbed, so that the hulls split open and the meat lump or kernel is free to pass through the slot down into the conical chamber. This rubbing or rolling effect is produced by rubbing devices 21, arranged on radial arms 22, preferably six in number, extending from a central hub 23, surrounding the vertical hollow shaft and connected by a web 24 to an interior shaft 25 within the hollow shaft, the latter being slotted at 26 to permit this web to pass through, and the connection being practically a splined one, so that by raising or lowering the inner shaft the hub, with its radial arms and rubbers, may be adjusted in relation to the slotted plate to secure the best results in operating upon the seed.

The interior shaft is adjusted vertically by its reduced threaded upper end passing through the cross-piece at the upper end of the hollow shaft and having an adjusting-nut 27 28 above and below the same, as shown in Figs. 5 and 6, said nuts being grooved to receive a wrench-key. The outer shaft is reduced at 29 to allow access to the lower nut. While this adjustment will alter the position of the rubbing-arms relative to the slotted plate or grating, it will be understood that the rotary movement of the outer hollow shaft will be imparted to the hub and its arms at all times through the web-and-slot connection.

As shown in Figs. 3 and 10, the hub has sockets 30, and these are dovetailed to receive the upturned ends of the radial arms. These upturned ends are slotted at 31, and headed bolts pass through them into the hub, and by this means any individual arm, with its rubbing sleeve or device, may be raised or lowered independently of the others in relation to the slotted plate or grating.

In my present machine I construct the slotted plate with a special view of securing the maximum efficiency, and by reference to Fig. 7 it will be seen that the slots do not extend as a single parallel group from side to side of the plate, but, on the contrary, each section (there being eight) has a series of parallel slots extending along the same. The side edges of these plates extend substantially radial from the center of the casing and to the circumference, and the slots extend parallel to one edge of the said section, and from this construction it will be seen that the whole plate presents a slotted surface the slots of which are of equal width, grouped into parallel series, and that these are so disposed that the radial rubber in its movement around the center of the casing will constantly cross these slots, and at no time will the movement of the rubber-arm be such as to carry the seed longitudinally of a slot without pressing the seed against the edge of the slot. On the contrary, every point on the rubbing-arm will be moving transversely of the slots in all the positions of said arm, and this will serve to subject the seed to the maximum rubbing effect, as each seed will be held by the edges of the slot against undue movement while the rubbing-arm is passing over the same, the seed being pressed and rubbed by the arm, so that the hull is split open, and this in its split but uncrushed state is pressed through the slot, together with the meat lump, the latter also remaining uncrushed and intact. This arrangement of slots in the several sections secures not only the maximum rubbing effect, but it prevents the seed from being forced out or from collecting at one point, as would be the case were all the slots throughout the whole plate arranged parallel to each other, as this would of necessity make portions of the slots coincide with the movement of the arms and thus provide channels along which the seed could be pushed by the rubber-arms without the desired rubbing or pressing action which results from the seed being gripped by the movement of the rubber-arms transversely of the slot edges. The improved plate, it will therefore be seen, consists of a series of sections each having a series of parallel slots therein, the arrangement being such that the slots of one section are at an angle to those of another section. Not only do I provide by the slots a series of splitting edges for the hulls, but by my sectional form of grating the spaces between the adjacent radial edges of the sections provide radial grooves across which the whole radial arm must move directly at right angles. The radial edges of the sections thus constitute splitting edges to act on the seed in connection with the rubbers.

I do not wish to limit myself strictly to the sectional feature of the plate, though this is the preferred form. In order to increase the holding effect of the slots on the seed, the edges of the bars between the slots are curved or concaved, so that the slot is in effect an extended concave pocket in which the seeds are held and pressed by the rubber-arms.

I find the best effects are produced by using rubber-arms of rigid material adapted to split and press the seed through the slots of the plate, and for this purpose I provide rubber-arms 21 of steel, which are hollow, as shown in Fig. 9, and are fitted to the radial arms 22. These rubbers in cross-section are of substantially elliptical form and are grooved longitudinally to provide pockets corresponding to the concaved pockets formed by the slots. This grooved surface insures a firm gripping effect on the seed-hull, and as the rubbing-arms taper laterally the narrow edges thus provided serve to catch the seed and direct them between the gripping-surfaces.

From the hopper a plate 30 extends inwardly at an inclination, and upon this plate the seeds fall and are directed inwardly to the center of the slotted plate, and as they fall thereon they are immediately acted on by the rubbing-arms and by the gripping or splitting edges of the bars forming the plate. The centrifugal force due to the action of the rubbing-arms is such that the seeds move or are rolled outward along the slots, being thus turned, and at the same time they are subjected to the pressing action of the rubbing-arms, which splits the hull, and in practice the action is such that before the seed reaches the outer end of the slot the hull has been split to such an extent as to free the kernel, which then, together with the whole hull, is pressed through the slot into the funnel-shaped space below the grating. The slots flare downwardly and thus provide spaces through which the hull and kernel are free to fall. The sections of the grating are held by screws to the casing, and dowel-pins 35, Fig. 7, on the sections serve to center the same and determine their exact position relative to each other.

In order to better restrain the seed from working rapidly toward the circumference of the grating under the movement of the rubbers, I may use rubbing-arms having inclines or screw-threads 36, Fig. 12, thereon so directed that the seed engaged thereby in the rotary movement of the arms will be forced inwardly toward the center of the casing, and thus counteract to a great degree the centrifugal action, keeping the seed so spread over the grating as to secure the best result. These screw-threaded arms may be of sleeve form, similar to that described to be slipped onto the radial arms. After passing through the grating or slotted plate the hulls and the kernels freed therefrom fall through the depending conical extension onto a shaking-sieve 37, which is supported on rollers 38, projecting inwardly from the supporting-legs 39 of the main casing, said rollers turning on pins 40 of the said legs.

For giving the screen its shaking movement a lever 41 is pivoted on a pin 42, projecting from the ring-casing, its upper end being forked and embracing an eccentric 43 on the main driving-shaft, while its lower end is also forked and embraces a pin on the side of the screen-frame. The screen not only has longitudinal reciprocation, but I give the same a lateral shaking in order to better distribute the material upon the same. For this purpose I use the same lever and eccentric, the latter having a cam-groove 44 in its periphery, Fig. 4, in which a projection or roller from the lever works and thus gives the said lever a lateral oscillation. To permit this, the pivot-eye of the lever has a rounded inner surface, as in Fig. 4, so that the lever can rock laterally on said pivot. The lower end of the lever may play between collars 45. This screen serves to separate the hulls and kernels from fine dirt or fine particles of matter which can pass through the screen to be caught on a plate 46, from which it may be removed. The hulls and kernels passing down the screen are subject to an air-blast from a trunk 46ª, directed from below up through the meshes of the lower part of the screen and at an inclination, air being supplied to the trunk by a fan 48.

At the lower end of the screen a discharge-spout is placed, and this is of funnel shape, widening out from the lower end of the screen, and the blast of air blows the hulls over the lower rail 49 of the screen and into this funnel to be discharged into any suitable receptacle, as directed. The kernels, however, which are heavier than the hulls, pass over the rail 49 and drop through an opening 50, adjacent thereto, in the discharge-spout. This opening is regulated by a gate or valve pivoted to the spout, having one side projecting down from the funnel and the other side projecting up into the same. The hulls pass over the inner half of this gate, while the kernels fall from the outer half into a suitable receptacle. The gate is adjusted to permit a more or less rapid discharge of the kernels and hulls. The blast of air may also be regulated by a gate-valve at 50.

I claim—

1. A cotton-seed-hulling machine comprising a slotted plate, and a rubbing device arranged above the plate and permanently out of contact therewith adapted to rub the seed over the surface of the plate and against the edges of the slots to split the hulls, substantially as described.

2. In combination in a cotton-seed-hulling machine, the casing and a plate made up of a series of sectors each sector being slotted and arranged with a slot or space between it and the other sectors, the edges of said slots in the sectors and between the sectors forming splitting edges and means for rolling the seed in connection therewith.

3. In combination in a cotton-seed-hulling machine, a casing, a slotted plate made up of sectors arranged about the central shaft of the casing and having their adjacent edges arranged to form radiating slots leaving the edges of the sectors exposed and the radiating rubbing-arms extending from a central shaft, and adapted to rub with means for operating the shaft, substantially as described.

4. In combination in a cotton-seed-hulling machine, a sectional plate, the sections of which are arranged about a shaft each section having paralleled grooves extending substantially radially from the shaft, those of one section being at an angle to those of the other sections and said sections having radial slots between them and means for rubbing the seed in connection with said slotted plate, substantially as described.

5. In combination in a cotton-seed-hulling machine the casing, the slotted plate, and the rubbing-arms moving over said plate, the slots in the plate having widened upper portions, the widened upper parts of the slots receiving the seed to be acted on by the rubbing-arms and the narrow lower parts opening downward through the plate.

6. In combination with the casing, the slotted plate having slots opening downward through the plate and arranged substantially radially and the rotary rubbing-arms having grooves and ribbed portions, said arms also extending radially to coact with the radial slots.

7. In combination, the casing the slotted plate, the central hollow shaft, the hub about the same, the rubbing-arms independently adjustable on said hub and the inner adjustable shaft connecting with the hub for adjusting the same.

8. In combination, the casing, the grating therein, the central shaft, the hub having the dovetailed seats and the arms adjustable in said seats and adapted to move over the slotted plate substantially as described.

9. In combination, the casing, means therein for splitting the hulls from the kernels, the discharge-spout having a gate pivoted intermediate of its ends and a blower having its mouth directed across the upper inner end of said gate, and upwardly through the lower end of the screen, substantially as described.

In testimony whereof I affix my signature in presence of two witnesses.

FRANK W. CROSS.

Witnesses:
HENRY E. COOPER,
F. L. MIDDLETON.